June 17, 1924.
C. L. JOHNSON
1,498,380
MEANS FOR PREVENTING ACCESS TO COVER SECURING DEVICES
Filed July 10, 1922
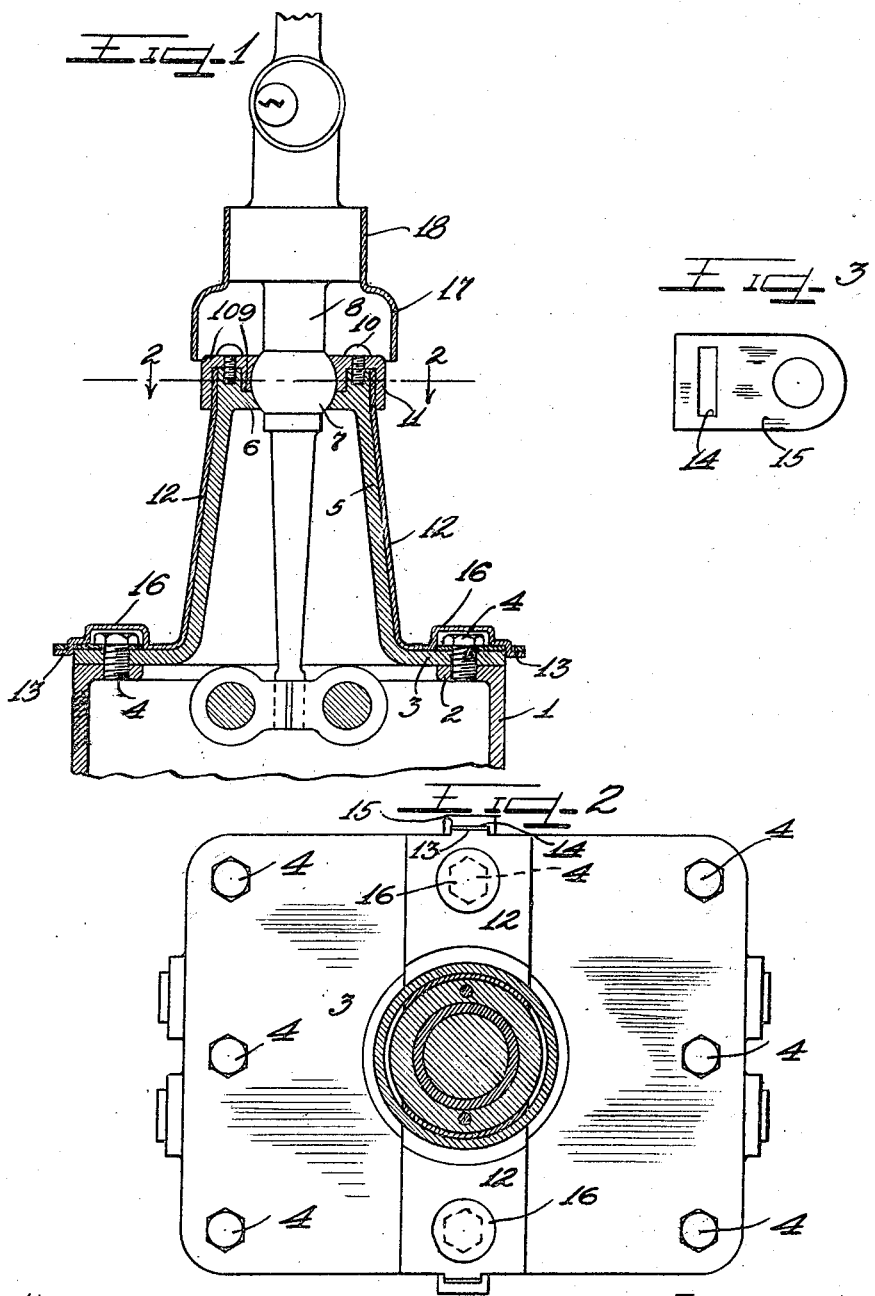
Inventor
COLVIN L. JOHNSON

Patented June 17, 1924.

1,498,380

UNITED STATES PATENT OFFICE.

COLVIN L. JOHNSON, OF ST. LOUIS, MISSOURI, ASSIGNOR TO JOHNSON AUTOMOBILE LOCK CO., A CORPORATION OF ILLINOIS.

MEANS FOR PREVENTING ACCESS TO COVER-SECURING DEVICES.

Application filed July 10, 1922. Serial No. 574,004.

*To all whom it may concern:*

Be it known that I, COLVIN L. JOHNSON, a citizen of the United States, and a resident of the city of St. Louis, county of St. Louis, and State of Missouri, have invented certain new and useful Improvements in a Means for Preventing Access to Cover-Securing Devices; and I hereby declare that the following is a full, clear, and exact description of the same, reference being had to the accompanying drawings and to the numerals of reference which form a part of this specification.

This invention relates to means for preventing access to cover securing devices, and particularly to means which are adapted to prevent the removal of the cover from a transmission housing or similar container.

In order to prevent the theft or unauthorized use of motor vehicles or other gear operated mechanisms, it is customary in many cases to lock the transmission gears thereof in a neutral or inoperative position by locking means which are associated with the gear shift lever or otherwise.

While such locking means are highly successful in attaining their desired purpose, it is nevertheless possible in certain cases to remove the transmission housing cover and the gear locking means, after which the gears may be shifted into operating position and the vehicle or other mechanism operated.

It is an important object, therefore, of the present invention to provide means which are adapted to be engaged over the cover securing means of the transmission housing or casing to prevent unauthorized removal of the cover therefrom.

Other and further important objects of this invention will be apparent from the disclosures in the specification and the accompanying drawings.

The invention (in a preferred form) is shown on the drawings and hereinafter more fully described.

On the drawings:

Figure 1 is a fragmentary central vertical transverse section taken through a transmission housing or casing provided with the securing devices of this invention.

Figure 2 is a section on the line 2—2 of Figure 1.

Figure 3 is an enlarged detail of a part of the locking means.

As shown on the drawings:

The reference numeral 1 indicates a transmission housing or casing or suitable container which is provided at its upper edge with an inwardly extending integral flange 2, a suitable cover 3 being secured to said flange 2 by means of hexagon-headed machine screws 4 engaged through registering threaded apertures in said cover 3 and said flange 2. Extending upwardly from the central portion of the cover 3 is a dome portion 5 which is provided at its upper end with an inwardly extending flange 6 affording a spherical seat for a spherical portion 7 formed on a gear shift lever 8. The upper side of said spherical portion 7 is positioned by a grooved annulus 9, the inside of which is formed to fit said spherical portion, said annulus 9 resting on the upper side of the flange 6 and on the upper edge of the dome portion 5, being secured to said dome portion by means of machine screws 10 engaged through said annulus 9 and engaged in threaded apertures in the upper end of said dome portion 5. Integrally formed on the outside of said annulus 9 is a depending annular flange 11 which extends downwardly in parallel relation and separated a short distance from the outside of the dome portion 5.

Engaged between said flange 11 and the outside of the dome member 5 are a plurality of securing plates 12 which are preferably formed of hardened metal and which follow the contour of the dome portion 5 and the top of the cover member 3 and extend to the edge of the cover member, where they are provided with downwardly and outwardly formed tongues 13 which are engaged through slots 14 formed in plates 15 which are preferably constructed of hard metal and which are engaged around machine screws 4 between the underside of the heads thereof and the upper face of the cover 1, and which extend outwardly so that said slots 14 therein are just at the outer edge of said cover portion 3.

Said plates 12 are formed upwardly as indicated at 16 to afford recesses therebeneath for the heads of the machine screws 4, and it is apparent that with said plate in the position indicated access to and removal of said machine screws 4 is prevented. Said securing plates 12 and the members 15 are placed in position at the time the device is assembled and prior to the mounting of the lever 8, and means are provided on said lever for preventing access to the screws 10 after the mechanism is assembled. Said means comprise an annular apron 17 which is permanently secured to the lever 8 by means of an integral annular flange 18 thereon which is secured to an annular boss 19 upon said lever in a permanent manner after the lever has been mounted in position. Said apron 17 depends from the flange 18 to the upper and outer edge of the annulus 9, and while it is sufficiently separated from said annulus to permit free movement of the lever, it is positioned close enough thereto to prevent the insertion of a tool for the removal of the screws 10. Consequently, when the device is assembled, access to the machine screws 4 which secure the cover on the casing and the removal of said screws and the cover is prevented.

While I have illustrated herein a construction employing two of the plates 12, it is of course apparent that a larger number might be used if desired, thereby providing means preventing access to certain of the cover securing screws.

I am aware that numerous details of construction may be varied through a wide range without departing from the principles of this invention, and I do not purpose limiting the patent granted, otherwise than necessitated by the prior art.

I claim as my invention:

1. The combination with a transmission casing, of a cover thereon, means engaged through the cover and casing for securing the cover thereon, a gear shift lever mounted in the cover, removable means for securing said lever in position, fixed means on the lever preventing access to said removable means, protection plates engaged between the cover and said removable means and over said first mentioned means for preventing access thereto, and slotted members held in place by said securing means and engaged by said protecting plates to hold the same in place.

2. The combination with a transmission casing, of a cover thereon, means normally accessible from the outside of the cover for securing the same to the casing, a gear shift lever mounted in the cover, removable means for securing said lever in position, an annular apron fixed on the lever preventing access to said removable means, and means projecting into said removable means and over the cover securing means for preventing access thereto.

3. The combination with a transmission casing, of a cover thereon, screws for securing the cover to the casing, gear shift means mounted in the cover, inaccessible means for positioning said gear shift means, slotted plates engaged on said screws and means engaged between said positioning means and the cover and interfitting with said slotted plates for rendering the securing means inaccessible.

4. The combination with a transmission casing, of a cover thereon, a plurality of means for securing the cover to the casing, gear shift means mounted in the cover, inaccessible means for positioning said gear shift means, and a plurality of interfitting means engaged between said positioning means and the cover for rendering the securing means inaccessible.

5. The combination with a casing, of mechanisms therein and a cover thereon, screws for securing the cover on the casing, means on the cover for controlling the mechanisms within the casing, means on the cover for positioning said controlling means, an annular apron on the controlling means rendering said positioning means inaccessible, apertured plates held in place by said screws and having slots therein, and plates projecting through the slots and engaging between said casing and said positioning means for rendering said screws inaccessible.

6. The combination with a casing, of mechanisms therein and a cover thereon, screws engaged through the cover and into the casing for securing the cover thereon, the heads of said screws being on the outside of the cover, slotted means engaged around the screws between the heads thereof and the outside of the cover, means on the cover for controlling the mechanisms within the casing, means on the cover for positioning said controlling means, means on the controlling means rendering said positioning means inaccessible, and means engaging said slotted means and engaged between the cover and said positioning means for preventing access to the head of the screws.

In testimony whereof I have hereunto subscribed my name in the presence of two subscribing witnesses:

COLVIN L. JOHNSON.

Witnesses:
  CARLTON HILL,
  OSCAR HARTMANN.